July 3, 1923.

H. H. BERRY 1,460,698

DISTRIBUTING BOX CONNECTION FOR ELECTRICAL CONDUCTORS

Filed Sept. 23, 1922

INVENTOR

Herbert H. Berry

BY Chapin & Neal

ATTORNEYS

Patented July 3, 1923.

1,460,698

UNITED STATES PATENT OFFICE.

HERBERT H. BERRY, OF SPRINGFIELD, MASSACHUSETTS.

DISTRIBUTING-BOX CONNECTION FOR ELECTRICAL CONDUCTORS.

Application filed September 23, 1922. Serial No. 590,183.

*To all whom it may concern:*

Be it known that I, HERBERT H. BERRY, citizen of the United States, residing at Springfield, in the county of Hampden and State of Massachusetts, have invented new and useful Improvements in Distributing-Box Connections for Electrical Conductors, of which the following is a specification.

The present invention relates to means for connecting electrical conductors into distributing boxes or the like and it is particularly adapted for use in manholes of underground cable systems where it is essential to provide watertight connections between the cables and the walls of the distributing boxes into which the cables are lead.

One object of the invention is to provide a novel and improved device for insuring a watertight and moisture-proof connection between a cable or other electrical conductor and a distributing box or equivalent structure.

Another object of the invention is to provide means which may be readily manipulated to secure a watertight connection between a distributing box and an entering cable or to release the cable to enable it to be disconnected from the box without injury to the box or to the cable.

Another object of the invention is to provide a self-contained device in the nature of a stuffing box which may be conveniently attached to a distributing box or detached therefrom, and which is of simple, inexpensive and thoroughly practical construction.

With the above stated objects in view, the invention resides in the improved connecting device hereinafter described, the advantageous features of which will be apparent from the following description and the novelty of which is particularly defined in the appended claims.

The invention will be explained with reference to the accompanying drawings, in which:—

Figure 1:
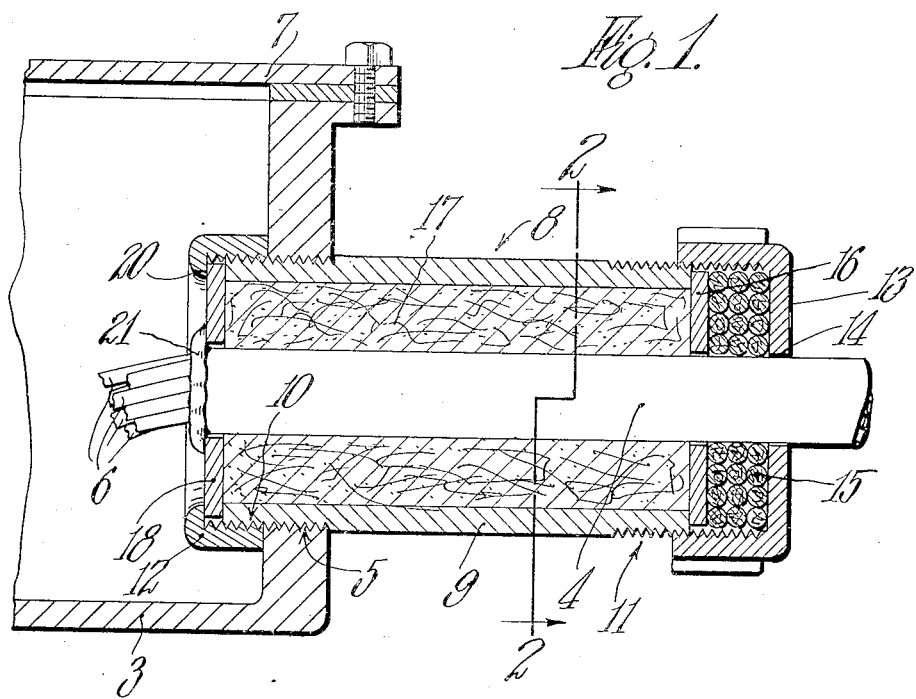
Figure 2:
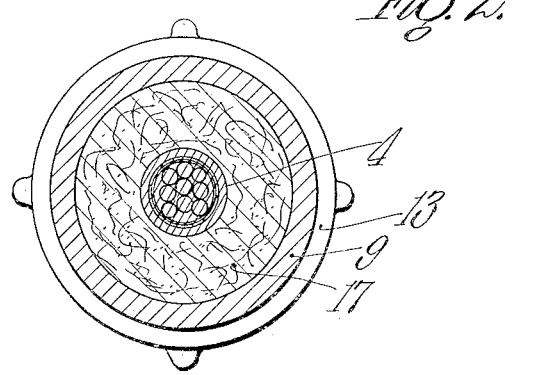

Fig. 1 is a longitudinal sectional view of a connecting device embodying the invention in its preferred form, this figure showing also a portion of a distributing box to which the connecting device is attached and a cable which is connected into said box by means of said device; and Fig. 2 is a section on the line 2—2 of Fig. 1.

Referring to the drawings, a distributing box of known construction is indicated at 3, and an electric cable at 4, the latter entering the box through one of a plurality of apertures 5 which are provided in the side wall thereof. In accordance with the usual construction, the box 3 may be provided with one or more suitable distributing plates or terminal boards (not shown) to which the component wires 6 of the cable 4 are to be connected, and with a cover plate 7 which is secured to the top of the box and is removable to give access to its interior for the purpose of making the requisite connections between the entering and outleading wires.

It has heretofore been customary to let cables into a distributing box of this character through an ordinary short length of bushing having an internal diameter greater than the diameter of the cable, the bushing being threaded into one of the apertures in the side of the box and the space between the cable and the inner surface of the bushing being filled with lead. This use of lead, which is applied in a molten state, makes it difficult or impossible to remove the cables from the bushing when desired without serious injury to the cables.

In accordance with the present invention, a self-contained connecting device 8 is employed, in lieu of the lead-filled bushing above mentioned, said device 8 being adapted to provide a watertight connection between the cable and the distributing box as well as securely to anchor the cable end to the box.

The improved connecting device 8 is in the nature of a stuffing box and is provided with two independent chambers for the reception of packing, one of said chambers being constructed and arranged to enable the packing to be compressed to any desired extent to mechanically secure the cable in place and to positively prevent the passage of moisture along the cable and into the box. The connecting device comprises a unitary structure which is adapted to be securely attached to the box or to be readily detached therefrom and which is so designed that a watertight connection with the cable may be established without the use of lead, solder or similar joint-forming substance and that said device may be manipulated to release said cable when desired to permit the latter to be withdrawn from the box without injury to either the cable, or the box or to the connecting device itself.

As shown, the improved connecting device 8 comprises a sleeve or bushing 9 which is externally screw-threaded at its opposite ends, as indicated at 10 and 11, one of said ends being adapted to be screwed into the aperture 5 which is threaded to receive it. The threads 10 extend inwardly from the end of the bushing 9 a sufficient distance to insure that when the bushing has been tightly screwed into the aperture 5 the inner end of the bushing will project into the interior of the distributing box sufficiently to receive a nut 12 which is tightened against the inside wall of the box and serves to securely lock the bushing 9 in place.

The outer end of the sleeve or bushing 9 is provided with a cap 13, shaped as shown in Fig. 1, and internally screw-threaded to engage with the threads 11 on the sleeve. The end wall of the cap 13 is centrally apertured at 14 to receive the cable which is to be let in to the distributing box. The bushing 9 and the side wall of the cap 13 may be considered the inner and outer members, respectively, of a housing for confining packing which will hereinafter be described.

The interior of the cap 13 is partially filled with graphite packing 15 which encircles the cable 4 and is confined within the cap by means of a washer 16 which is fitted over the cable and lies within the threaded inner side wall of the cap, said washer being depressed within the cap sufficiently to expose the threads adjacent the open end of the cap for engagement with the threads of the bushing 9. The aperture 14 in the cap 13 and the aperture in the washer 16 are of a size to fit closely upon the cable and these apertures, being centrally located in the cap and washer enable the cap and washer to position and support the cable in axial alinement with the bushing 9. The inside diameter of the sleeve 9 being greater than the diameter of the cable, an annular space is thus afforded between the sleeve and the cable, this space extending throughout the length of the sleeve and being adapted to receive suitable packing 17 such as cotton waste or the like, the latter being preferably impregnated with paraffine or beeswax to render it moisture-repellent.

To confine the packing 17 within the sleeve 9 at the inner end of the latter, a washer 18 is provided which is adapted to encircle the inner end of the cable, and is arranged to overlap the end of the sleeve and to fit within the threaded interior of the nut 12. To retain the washer 18 in place, the nut 12 is enlarged internally to provide an annular shoulder 20 to overlap and engage the face of the washer adjacent its outer periphery. It will be seen that the nut 12 thus has the double function of locking the sleeve 9 in the side wall of the distributing box and of holding the washer 18 in place to prevent displacement of the packing 17. The nut 12 and the washer 18 together constitute a cap or closure for the inner end of the bushing.

In connecting a cable into the box 3, the cap 13 is unscrewed from the sleeve 9 and is slipped over the end of the cable. The graphite packing 18, which is in the usual rope form, is then coiled around the cable within the cap until a sufficient depth of packing has been built up in the cap. The washer 16 is then fitted over the cable and pressed against the packing 15. The free end of the cable which projects beyond the washer 16 is then projected through the sleeve 9 and the cap is screwed upon the outer end of the sleeve. The prepared cotton waste constituting the packing 17 is then forced into place around the portion of the cable which extends through the sleeve 9. Then the washer 18 is slipped over the inner extremity of the cable and the nut 12 is screwed upon the inwardly projecting end of the sleeve 9 securely fastening the sleeve to the box 3 and also binding the washer between the shoulder 20 and the end of the sleeve 9.

After the parts have been assembled, as described, the cap 13 is turned by means of a suitable wrench to compress the graphite packing within the cap causing it to be forced tightly against the cable 4 so as to insure a water tight joint and also to grip the cable so as to mechanically secure it to the connection unit 8. It will be apparent that the washer, by overlapping the sleeve 9 provides a rigid wall against which the graphite packing may be compressed by the turning of the cap 13. The washers 16 and 18 serve to hold the packing 17 in place and also to support the cable and locate it axially with respect to the sleeve 9. Both the nut 12 and the cap 13 are adapted to be tightened by means of a Stillson wrench. A single wrench therefore is the only tool that is necessary for assembling the parts of the connection unit 8, for rigidly securing the same to the distributing box and for tightening the cap 13 to insure an absolutely water tight joint between the cable and the box. After the cable has been connected to the box 3 the lead sheathing which surrounds the component wires of the cable may be stripped back from the ends of the wires which project into the box and rolled back against the washer 18, as indicated at 21 in Fig. 1, thus enabling the wires to be readily manipulated as desired in making connections with the terminal board. The cable may be removed from the box without damage to the cable by merely loosening the cap by means of the wrench, and disconnecting the component wires from the terminal board.

The packing contained between the washers 16 and 18 being moisture-repellent by virtue of the paraffine or equivalent substance with which it is impregnated, is well adapted to exclude moisture from the distributing box under ordinary conditions of use. The employment of the graphite packing 15, however, insures absolute protection against the entrance of water or moisture into the box. By turning the cap 13, the degree of compression of the graphite packing may be increased as desired to cause it to grip the cable more securely and thus to increase its effectiveness as a moisture proofing agent.

It will be obvious that the parts of the herein described connection unit are of simple and rugged construction and that the whole device may be economically manufactured. In the use of the connecting device there is no soldering or wiping of the lead sheath of the cable to the bushing or sleeve through which it tends as has been the case heretofore for the purpose of making the joint watertight. A very substantial saving of time is also effected by the use of the improved connection unit herein described, it requiring only about ten minutes to insert a cable into the box or to remove it therefrom when said device is employed.

The invention having been described what is claimed and desired to be secured by Letters Patent is,—

1. A device for connecting an electrical conductor with a distributing box or the like, comprising a bushing adapted to loosely surround the conductor and to be removably secured at one end to the box, closures for the opposite ends of the bushing having apertures for the passage of the conductor therethrough, one of said closures comprising a cap secured to the bushing with its end wall spaced from the end face of the bushing, a washer within said cap adapted to encircle the conductor and overlap the adjacent end face of the bushing, packing material surrounding the conductor within the bushing, and packing material within said cap between its end wall and the washer adapted to be compressed to grip the conductor by the turning of the cap.

2. The combination with an electric cable and a distributing box or the like, of a device in the nature of a stuffing box for connecting the cable to the distributing box, said device comprising inner and outer cylindrical housing members each closed at one end except for an aperture to receive the cable, the open end of one of said members being screw-threaded upon the open end of the other of said members, a transverse partition adapted to encircle the cable and to bear against the open end of the inner housing member, a packing within the inner housing member, and a packing within the outer housing member adapted to be compressed by the turning of the outer member upon the inner member.

3. The combination with an electric cable and a distributing box, of means for connecting the cable into the box comprising a bushing having an inside diameter greater than the diameter of the cable, said bushing surrounding the cable and being screw-threaded into the wall of the box, caps for closing the inner and outer ends of the bushing, said caps being apertured to permit the cable to extend therethrough and the end of the outer cap being spaced from the outer end of the bushing, a washer surrounding said cable between the end of the outer cap and the corresponding end of the bushing and bearing against said end, moisture-repellent packing material within said bushing, and graphite packing material within said outer cap adapted to be compressed between said cap and washer by the tightening of said cap.

4. The combination with an electric cable and a distributing box or the like having a screw-threaded inlet opening, of means for providing a watertight connection between said cable and box comprising a bushing externally screw-threaded at its opposite ends one of which is adapted to be screwed into said opening and to project into the box, a washer adapted to encircle the cable and to overlap the inner end face of the bushing, a nut within said box threaded upon the projecting inner end of the bushing and adapted to bear against the wall of the box to lock the bushing thereto, an internal annular shoulder on said nut for engaging the washer to retain it in place, a second washer adapted to encircle the cable and to overlap the outer end face of the bushing, a packing within said bushing between said washers, a cap threaded upon the outer end of said bushing having an end wall spaced from the second washer and apertured to receive the cable, and a packing within said cap between the second washer and said apertured end wall adapted to be compressed by the turning of said cap.

5. The combination with an electric cable and a distributing box, of means for connecting said cable to said box comprising inner and outer tubular members having overlapping ends screw-threaded together to provide a housing adapted to loosely surround a portion of the cable, said members having their remote ends closed except for apertures to receive the cable, means for securing the inner tubular member to said box, a packing within said inner member, a packing within said outer member, and a transverse partition wall between said packings constructed and arranged to resist compression of the packing in said outer member caused by turning of said member relatively to said inner member.

In testimony whereof I have affixed my signature.

HERBERT H. BERRY.